(12) United States Patent
Okawa (10) Patent No.: US 9,392,676 B2
(45) Date of Patent: Jul. 12, 2016

(54) DISCHARGE LAMP LIGHTING DEVICE, PROJECTOR, AND METHOD FOR DRIVING DISCHARGE LAMP

(75) Inventor: Kazuo Okawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 278 days.

(21) Appl. No.: 12/869,964

(22) Filed: Aug. 27, 2010

(65) Prior Publication Data

US 2011/0095696 A1    Apr. 28, 2011

(30) Foreign Application Priority Data

Oct. 22, 2009   (JP) ................................. 2009-243208

(51) Int. Cl.
*H05B 41/288* (2006.01)
*H05B 41/292* (2006.01)

(52) U.S. Cl.
CPC ........... *H05B 41/2887* (2013.01); *Y02B 20/202* (2013.01)

(58) Field of Classification Search
CPC .......... H05B 41/2928; H05B 41/2882; H05B 41/2886; H05B 41/38; H05B 41/2883; H05B 41/388; H05B 41/288; H05B 41/2887; Y02B 20/208; Y02B 20/202; Y02B 20/204
USPC ............. 315/209 R, 224, 225, 226, 246, 247, 315/291, 307, 308; 353/46, 50, 85, 98, 100; 349/5, 8, 61
See application file for complete search history.

(56) References Cited

U.S. PATENT DOCUMENTS

| 4,920,300 | A |   | 4/1990 | Scott |
| 5,923,546 | A | * | 7/1999 | Shimada et al. ................. 363/40 |
| 6,459,213 | B1 | * | 10/2002 | Nilssen .......................... 315/224 |
| 7,161,305 | B2 | * | 1/2007 | Chen .......................... 315/209 R |
| 7,327,096 | B2 | * | 2/2008 | Monch et al. .................. 315/291 |
| 7,511,433 | B2 |   | 3/2009 | Okawa |
| 7,598,678 | B2 | * | 10/2009 | Harada et al. .................. 315/224 |
| 7,940,535 | B2 | * | 5/2011 | Itoh et al. .................... 363/21.12 |
| 7,999,481 | B2 | * | 8/2011 | Ono et al. ....................... 315/224 |
| 2002/0171374 | A1 | * | 11/2002 | Yasui et al. .................... 315/219 |
| 2004/0170036 | A1 | * | 9/2004 | Iwahori ........................... 363/89 |
| 2006/0049775 | A1 |   | 3/2006 | Kataoka |
| 2007/0159107 | A1 | * | 7/2007 | Powell ................... H05B 41/38 315/149 |
| 2007/0188107 | A1 | * | 8/2007 | Okawa ....................... 315/209 R |
| 2007/0285032 | A1 | * | 12/2007 | Fukuda et al. ................. 315/307 |
| 2008/0042592 | A1 | * | 2/2008 | Ashdown ....................... 315/250 |
| 2008/0164818 | A1 | * | 7/2008 | Ichikawa ........... H05B 41/2887 315/77 |
| 2009/0153073 | A1 | * | 6/2009 | Yamauchi et al. ............. 315/291 |
| 2009/0153806 | A1 | * | 6/2009 | Yamauchi et al. .............. 353/85 |

(Continued)

FOREIGN PATENT DOCUMENTS

| JP | 63-285899 A | 11/1988 |
| JP | 8-185992 A | 7/1996 |

(Continued)

*Primary Examiner* — Dylan White
(74) *Attorney, Agent, or Firm* — ALG Intellectual Property, LLC (57) ABSTRACT

A discharge lamp lighting device includes: a DC power supply unit that outputs a DC current; an inverter that sequentially generates, from the DC current output from the DC power supply unit, a current pulse whose current direction alternately changes to supply the current pulse to a discharge lamp; and a control unit that controls operations of the DC power supply unit and the inverter to adjust a waveform of the current pulse to be supplied to the discharge lamp, wherein the control unit changes a pulse width of the current pulse every pulse.

11 Claims, 5 Drawing Sheets

(56) References Cited

U.S. PATENT DOCUMENTS

| | | | |
|---|---|---|---|
| 2009/0231554 A1* | 9/2009 | Soma et al. | 353/85 |
| 2009/0237009 A1* | 9/2009 | Okawa | H05B 41/2928 315/307 |
| 2010/0033105 A1* | 2/2010 | Yamauchi et al. | 315/287 |
| 2010/0157257 A1* | 6/2010 | Nishizawa | H05B 41/2928 353/85 |
| 2011/0025989 A1* | 2/2011 | Ono | H05B 41/2928 353/85 |

FOREIGN PATENT DOCUMENTS

| | | |
|---|---|---|
| JP | 3741727 B | 11/2005 |
| JP | 2006-072196 A | 3/2006 |
| JP | 2007-214010 A | 8/2007 |
| JP | 2008-171640 A | 7/2008 |
| JP | 2009-224193 A | 10/2009 |
| JP | 2009-231095 A | 10/2009 |
| WO | WO-95-35645 A | 12/1995 |

* cited by examiner

DISCHARGE LAMP LIGHTING DEVICE, PROJECTOR, AND METHOD FOR DRIVING DISCHARGE LAMP

BACKGROUND

1. Technical Field

The present invention relates to a discharge lamp lighting device that drives a discharge lamp to turn on the discharge lamp, a projector, and a method for driving a discharge lamp.

2. Related Art

In lighting devices for discharge lamps used as light sources for projectors and the like, various techniques of giving a change in drive waveform to stabilize the arc position have been proposed. In a lighting device described in, for example, Japanese Patent No. 3741727 (Patent Document 1), a short current pulse is superimposed on an alternating rectangular wave current to be supplied to a discharge lamp in synchronization with the current. Using such a technique makes it possible to suppress flicker caused when the arc position is unstable.

However, superimposing a current pulse as described above causes electric power to be supplied to the discharge lamp, that is, the brightness of the discharge lamp to change periodically. Therefore, when a light source of a projector is turned on with the lighting device described in Patent Document 1, there is a problem in that stripe noise (scroll noise) occurs due to a deviation between a period of changing the brightness of the discharge lamp and a period of generating a screen (frame period).

SUMMARY

An advantage of some aspects of the invention is to solve at least a part of the problems described above and the invention can be realized as the following modes or application examples.

First Application Example

A discharge lamp lighting device according to a first application example includes: a DC power supply unit that outputs a DC current; an inverter that sequentially generates, from the DC current output from the DC power supply unit, a current pulse whose current direction alternately changes to supply the current pulse to a discharge lamp; and a control unit that controls operations of the DC power supply unit and the inverter to adjust a waveform of the current pulse to be supplied to the discharge lamp, wherein the control unit changes a pulse width of the current pulse every pulse.

According to the discharge lamp lighting device, the pulse width of the current pulse to be supplied to the discharge lamp is changed every pulse. Therefore, a drive waveform is always changed, whereby the occurrence of flicker is suppressed. In addition, since a drive period is not constant, the occurrence of scroll noise is also suppressed.

Second Application Example

In the discharge lamp lighting device according to the application example, it is desirable that the control unit randomly determines the pulse width of the current pulse within a predetermined fluctuation range.

Third Application Example

In the discharge lamp lighting device according to the application example, it is desirable that the control unit changes a current value of the current pulse every pulse.

Fourth Application Example

In the discharge lamp lighting device according to the application example, it is desirable that the control unit generates a current pulse of a trapezoidal wave and changes a gradient of the trapezoidal wave every pulse.

Fifth Application Example

A projector according to a fifth application example includes: the discharge lamp lighting device described above; a discharge lamp that is turned on by receiving the supply of a current pulse from the discharge lamp lighting device; an image forming unit that modulates light emitted from the discharge lamp to form image light; and a projection system that projects the image light formed by the image forming unit.

According to the projector, the same effect as that of the discharge lamp lighting device can be provided.

Sixth Application Example

A method for driving a discharge lamp according to a sixth application example includes: sequentially generating a current pulse whose pulse width is different every pulse; and supplying the current pulse to the discharge lamp to turn on the discharge lamp.

According to the method for driving the discharge lamp, the pulse width of the current pulse to be supplied to the discharge lamp is changed every pulse. Therefore, a drive waveform is always changed, whereby the occurrence of flicker is suppressed. In addition, since a drive period is not constant, the occurrence of scroll noise is also suppressed.

When the discharge lamp lighting device, the projector, and the method for driving the discharge lamp are constructed using a computer provided in the discharge lamp lighting device, the modes and the application examples can also be configured in other modes such as a program for realizing the function or a recording medium in which the program is recorded so as to be readable by the computer. As the recording medium, various types of media readable by the computer are available: for example, a flexible disk, a hard disk, an optical disc such as a CD or DVD, a magneto-optical disk, a memory card or USB memory having a non-volatile semiconductor memory mounted thereon, an internal storage unit (semiconductor memory such as a RAM or ROM) of the discharge lamp lighting device, etc.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
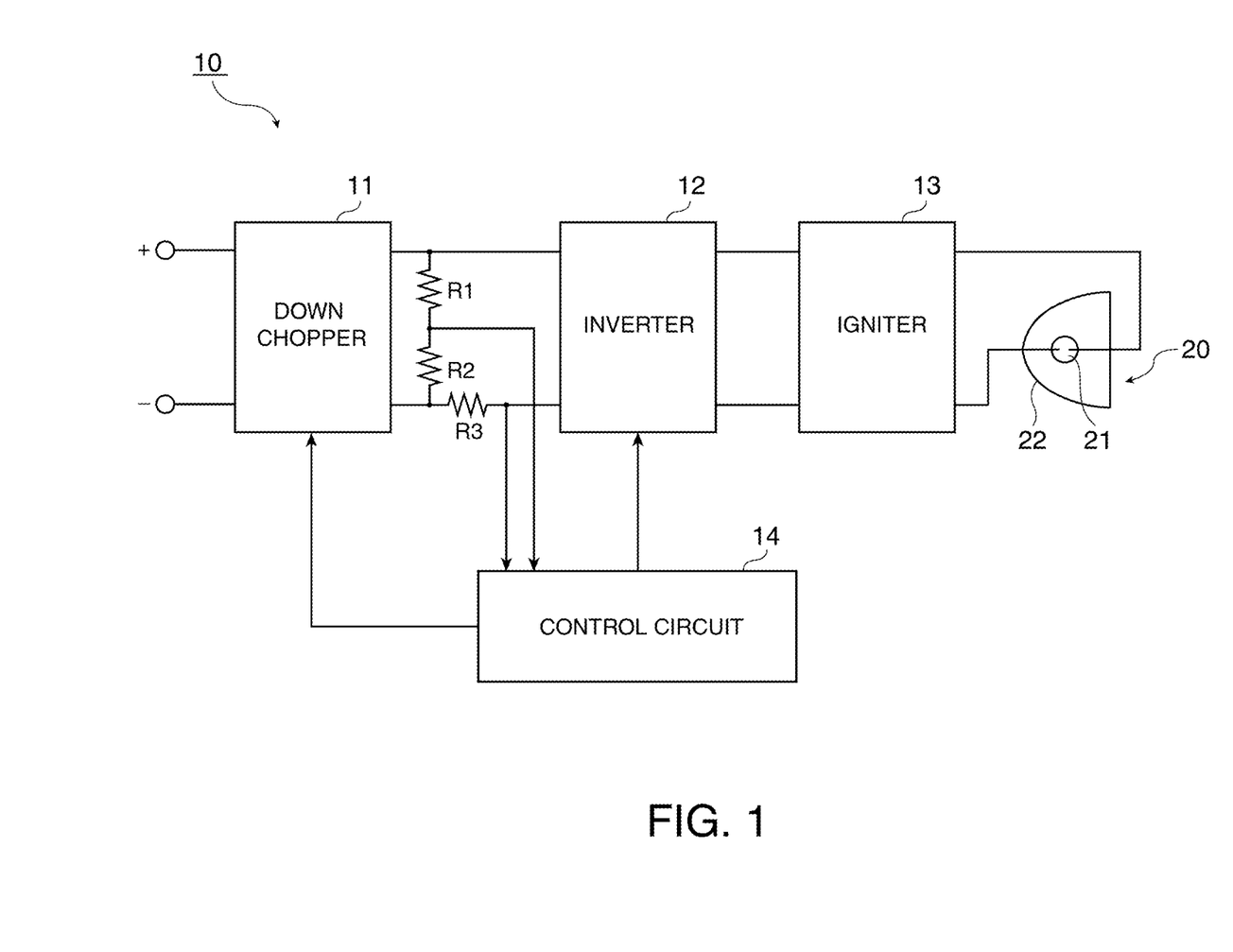
FIG. 1 is a block diagram showing a schematic configuration of a discharge lamp lighting device according to a first embodiment.

Hereinafter, a discharge lamp lighting device according to a first embodiment will be described with reference to the drawings. FIG. 1 is a block diagram showing a schematic configuration of the discharge lamp lighting device according to the first embodiment. As shown in FIG. 1, the discharge lamp lighting device 10 is configured to include a down chopper 11, an inverter 12, an igniter 13, and a control circuit 14 as a control unit. A light source device 20 as an object to be turned on by the discharge lamp lighting device 10 is connected to the igniter 13.

The down chopper 11, which corresponds to a DC power supply unit, steps down the voltage of DC electric power supplied from a not-shown external power supply unit by a chopper process and outputs the power to the inverter 12. The down chopper 11 can be configured to include, for example, a reflux diode, a smoothing coil, and a switching element such as a transistor (none of them not shown) and steps down the voltage by repeating on and off of the switching element. Two resistors R1 and R2 connected in series are connected in parallel with respect to the down chopper 11 at output terminals thereof. The potential of a connecting point between the resistor R1 and the resistor R2 is detected as a voltage value corresponding to an output voltage (lamp voltage) of the down chopper 11 and output to the control circuit 14. A resistor R3 is connected in series to the negative-side output terminal of the down chopper 11. An output-side voltage value of the resistor R3 is detected as a voltage value corresponding to the output current (lamp current) of the down chopper 11 and output to the control circuit 14.

The inverter 12 is composed of, for example, four switching elements or the like that are full-bridge connected. The inverter 12 sequentially generates a current pulse of a rectangular wave from a DC current supplied from the down chopper 11 and outputs the current pulse to the light source device 20 through the igniter 13. The inverter 12 of the embodiment generates a current pulse whose current direction alternately changes like an AC current. However, since the pulse width is changed every pulse in the embodiment as will be described later, a current-direction changing period is not constant. Strictly speaking, therefore, the current pulse is different from an AC current.

The igniter 13 is composed of, for example, an igniter transformer and a drive circuit for driving the igniter transformer, and generates a high voltage at the start of the lighting to apply the high voltage to the light source device 20. This breaks down insulation between electrodes of the light source device 20 to form a discharge path, and therefore the light source device 20 starts lighting. After the start of the lighting, the current pulse output from the inverter 12 is supplied to the light source device 20 through the igniter 13 to maintain the lighting of the light source device 20.

The control circuit 14 includes a computer composed of, for example, a microprocessor and a memory, and controls operations of the down chopper 11 and the inverter 12 according to a control program stored in the memory. Specifically, the control circuit 14 controls an output current of the down chopper 11 so that an output power of the down chopper 11 is substantially constant based on the detected values of the output voltage and output current of the down chopper 11. The control circuit 14 also controls the pulse width of the current pulse output by the inverter 12.

The light source device 20 includes a discharge lamp 21 and a reflection mirror 22. The discharge lamp 21 is a high-pressure discharge lamp formed of an extra-high pressure mercury lamp, a metal halide lamp, or the like. The discharge lamp 21 includes a gas containing mercury, a rare gas, and the like encapsulated, and a pair of electrodes whose distal ends are arranged to face each other, in a space covered with a light-transmissive material such as silica glass. When the lamp current is supplied to the electrodes, arc discharge occurs between the electrodes, whereby the discharge lamp 21 emits light. The light emitted from the discharge lamp 21 is reflected by the reflection mirror 22 formed of an ellipsoidal mirror or a parabolic mirror and exits in a predetermined direction.

The control circuit 14 of the embodiment changes the waveform of the current pulse supplied from the inverter 12 to the light source device 20 every pulse. Specifically, the control circuit 14 randomly determines the pulse width of the current pulse every pulse and controls the inverter 12 so that the inverter 12 generates a current pulse of the determined pulse width and supplies the pulse to the light source device 20.

Figure 2A:
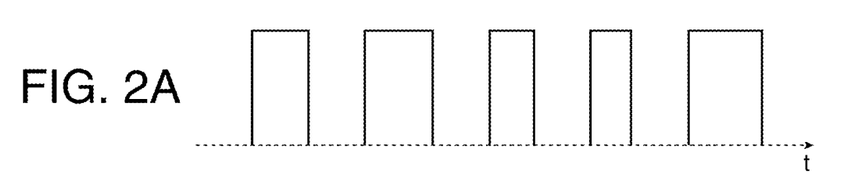
FIGS. 2A to 2D are explanatory diagrams each for explaining a change in waveform of a current pulse in the first embodiment.
Figure 2B:
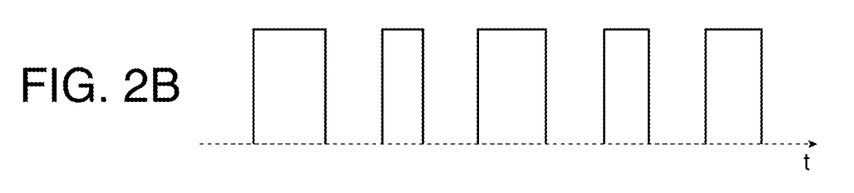
Figure 2C:
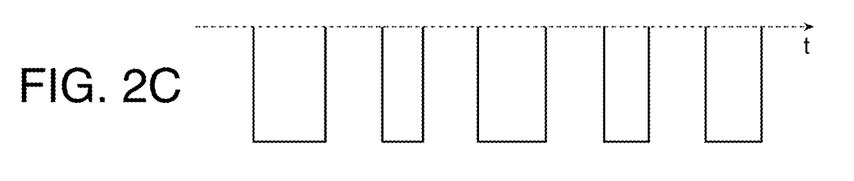
Figure 2D:
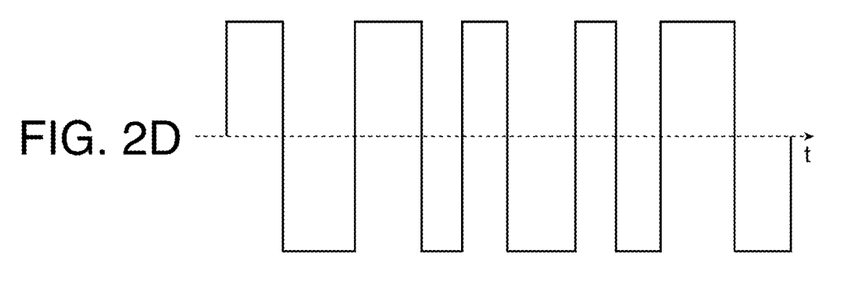

FIGS. 2A to 2D are explanatory diagrams each for explaining a change in waveform of a current pulse (change in pulse width), in which FIGS. 2A and 2B each show a pulse train composed of a plurality of current pulses sequentially determined by the control circuit 14; and FIG. 2C shows a pulse train obtained by inverting the polarity of each of the current pulses of the pulse train in FIG. 2B. FIG. 2D shows the pulse train in FIG. 2A and the pulse train in FIG. 2C combined together. In each of the drawings, the horizontal axis represents a time t, while the vertical axis (not shown) represents a current value.

As shown in FIGS. 2A and 2B, the control circuit 14 causes the inverter 12 to generate two pulse trains of a first pulse train (refer to FIG. 2A) to be supplied to one electrode (positive-side electrode) of the light source device 20 and a second pulse train (refer to FIG. 2B) to be supplied to the other electrode (negative-side electrode). The control circuit 14 randomly changes the pulse width of the current pulse every pulse in both the pulse trains. When the pulse width is determined in this case, a predetermined pulse width is defined as a reference for example; a predetermined fluctuation range (for example, ±10%) is set with respect to the pulse width; and a pulse width is determined within the fluctuation range based on a random number generated by a not-shown random number generating unit. Then as shown in FIG. 2C, the control circuit 14 inverts the polarity of the current pulses of the second pulse train of the two generated pulse trains.

The control circuit 14 causes the inverter 12 to supply an initial current pulse of the first pulse train to one electrode of the light source device 20 and thereafter to supply an initial current pulse of the second pulse train after polarity inversion to the other electrode. Similarly, also for the subsequent current pulses, the control circuit 14 causes the inverter 12 to alternately supply the current pulse of the first pulse train and the current pulse of the second pulse train after polarity inversion. As a result, the first pulse train and the second pulse train after polarity inversion are combined together. As shown in FIG. 2D, the light source device 20 is driven with a pulse train in which the current direction alternately changes, and the pulse width changes every pulse.

According to the discharge lamp lighting device 10 of the embodiment as described above, the pulse width of the current pulse to be supplied to the light source device 20 is changed every pulse. Therefore, a drive waveform is always changed, whereby the occurrence of flicker is suppressed. In addition, since a drive period is not constant, the occurrence of scroll noise is also suppressed.

Second Embodiment

Hereinafter, a discharge lamp lighting device according to a second embodiment will be described with reference to the drawings. The discharge lamp lighting device 10 of the embodiment also changes a current value every pulse in addition to the pulse width when the current pulse to be supplied to the light source device 20 is generated. Configurations other than this are the same as those of the first embodiment.

Figure 3A:
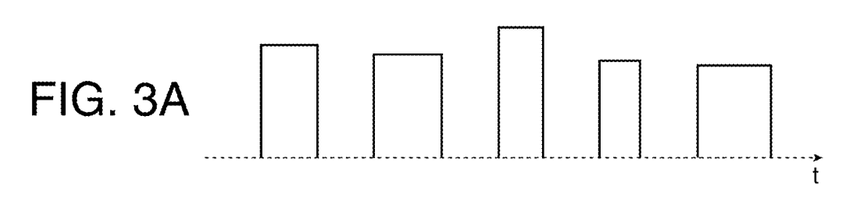
FIGS. 3A to 3D are explanatory diagrams each for explaining a change in waveform of a current pulse in a second embodiment.
Figure 3B:
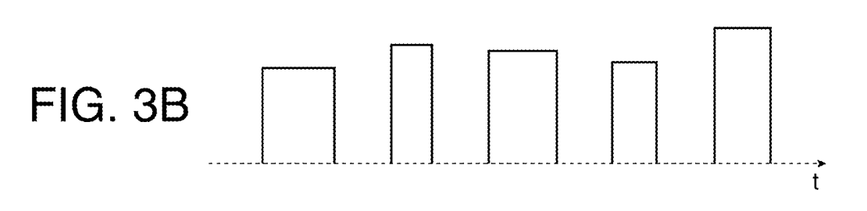
Figure 3C:
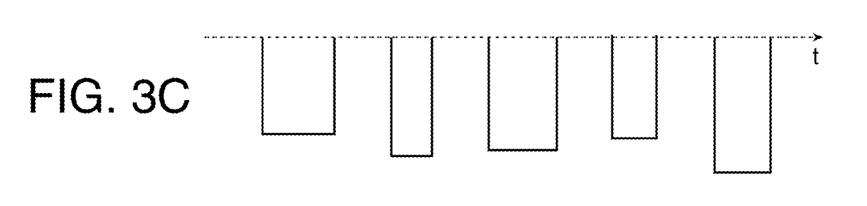
Figure 3D:
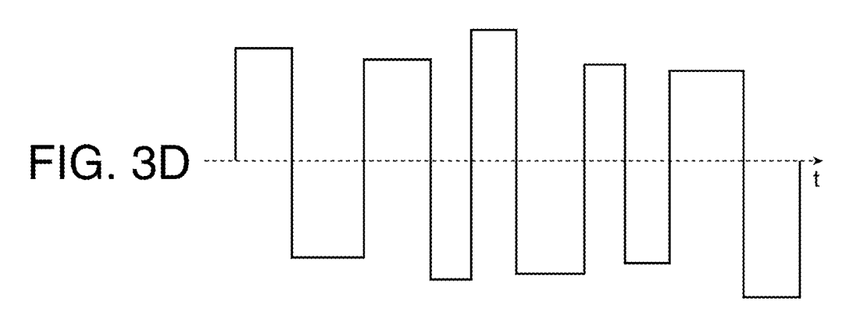

FIGS. 3A to 3D are explanatory diagrams each for explaining a change in waveform (change in pulse width and current value) of a current pulse in the embodiment, in which FIGS. 3A and 3B each show a pulse train composed of a plurality of current pulses sequentially determined by the control circuit 14; and FIG. 3C shows a pulse train obtained by inverting the polarity of each of the current pulses of the pulse train in FIG. 3B. FIG. 3D shows the pulse train in FIG. 3A and the pulse train in FIG. 3C combined together. In each of the drawings, the horizontal axis represents a time t, while the vertical axis (not shown) represents a current value.

As shown in FIGS. 3A and 3B, the control circuit 14 randomly changes also the current value every pulse in addition to the pulse width in both a first pulse train (refer to FIG. 3A) and a second pulse train (refer to FIG. 3B). When the current value is determined in this case, a current value necessary for making electric power to be supplied to the light source device 20 constant is defined as a reference for example; a predetermined fluctuation range (for example, ±10%) is set with respect to the current value; and a current value is determined within the fluctuation range based on a random number generated by a not-shown random number generating unit. The control circuit 14 causes the down chopper 11 to output an output current corresponding to the determined current value in synchronization with the generation of the current pulse by the inverter 12. Then as shown in FIG. 3C, the control circuit 14 inverts the polarity of the current pulses of the second pulse train of the two generated pulse trains.

The control circuit 14 causes the inverter 12 to supply an initial current pulse of the first pulse train to one electrode of the light source device 20 and thereafter to supply an initial current pulse of the second pulse train after polarity inversion to the other electrode. Similarly, also for the subsequent current pulses, the control circuit 14 causes the inverter 12 to alternately supply the current pulse of the first pulse train and the current pulse of the second pulse train after polarity inversion. As a result, the first pulse train and the second pulse train after polarity inversion are combined together. As shown in FIG. 3D, the light source device 20 is driven with a pulse train in which the current direction alternately changes, and the pulse width and the current value change every pulse.

According to the discharge lamp lighting device 10 of the embodiment as described above, the same effect as that of the first embodiment can be provided. In the embodiment, since the current value is also changed every pulse in addition to the pulse width, the effect of suppressing flicker is further improved.

Third Embodiment

Hereinafter, a discharge lamp lighting device according to a third embodiment will be described with reference to the drawings. The discharge lamp lighting device 10 of the embodiment supplies a current pulse of a trapezoidal wave in which a sawtooth waveform is superimposed on a rectangular wave to the light source device 20. When the current pulse is generated, the pulse width and the gradient (change ratio of the current value with respect to time) of the trapezoidal wave are changed every pulse. Configurations other than this are the same as those of the first embodiment.

Figure 4A:
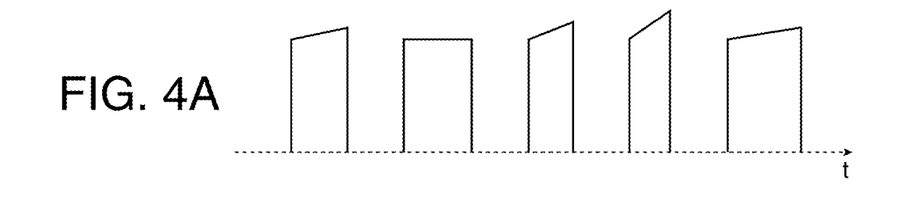
FIGS. 4A to 4D are explanatory diagrams each for explaining a change in waveform of a current pulse in a third embodiment.
Figure 4B:
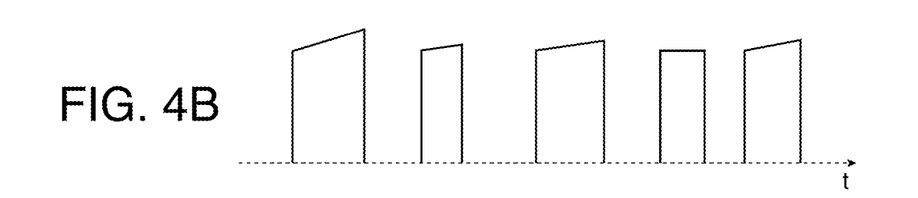
Figure 4C:
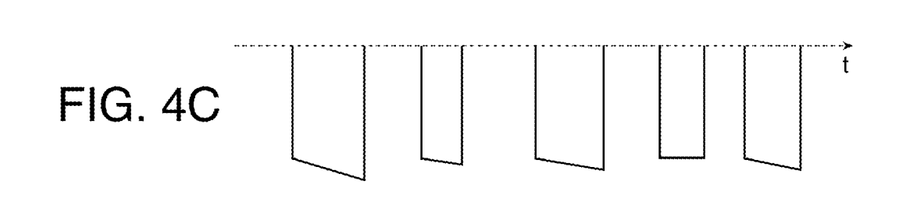
Figure 4D:
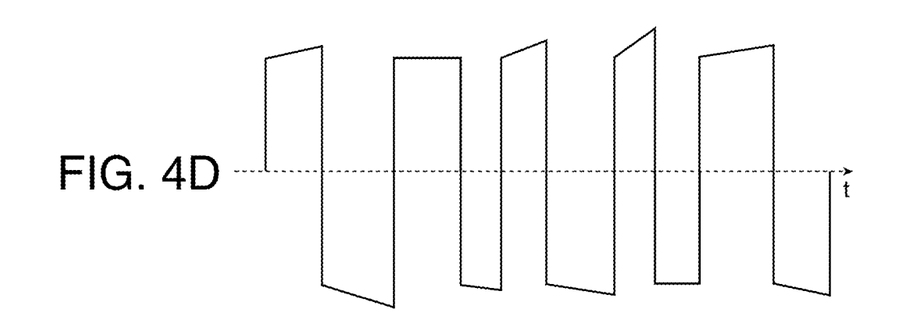

FIGS. 4A to 4D are explanatory diagrams each for explaining a change in waveform of the current pulse (change in the pulse width and the gradient of the trapezoidal wave) in the embodiment, in which FIGS. 4A and 4B each show a pulse train composed of a plurality of current pulses sequentially determined by the control circuit 14; and FIG. 4C is a pulse train obtained by inverting the polarity of each of the current pulses of the pulse train in FIG. 4B. FIG. 4D shows the pulse train in FIG. 4A and the pulse train in FIG. 4C combined together. In each of the drawings, the horizontal axis represents a time t, while the vertical axis (not shown) represents a current value.

As shown in FIGS. 4A and 4B, the control circuit 14 randomly changes the pulse width and the gradient of the trapezoidal wave every pulse in both a first pulse train (refer to FIG. 4A) and a second pulse train (refer to FIG. 4B). When the gradient of the trapezoidal wave is determined in this case, a predetermined fluctuation range is set for the gradient for example; and the gradient is determined within the fluctuation range based on a random number generated by a not-shown random number generating unit. The control circuit 14 changes the output current from the down chopper 11 in synchronization with the generation of the current pulse by the inverter 12 so that the current value changes with the determined gradient. Then as shown in FIG. 4C, the control circuit 14 inverts the polarity of the current pulses of the second pulse train of the two generated pulse trains.

The control circuit 14 causes the inverter 12 to supply an initial current pulse of the first pulse train to one electrode of the light source device 20 and thereafter to supply an initial current pulse of the second pulse train after polarity inversion to the other electrode. Similarly, also for the subsequent current pulses, the control circuit 14 causes the inverter 12 to alternately supply the current pulse of the first pulse train and the current pulse of the second pulse train after polarity inversion. As a result, the first pulse train and the second pulse train after polarity inversion are combined together. As shown in FIG. 4D, the light source device 20 is driven with a pulse train in which the current direction alternately changes, and the pulse width and the gradient of the trapezoidal wave change every pulse.

According to the discharge lamp lighting device 10 of the embodiment as described above, the same effect as that of the first embodiment can be provided. In the embodiment, since the gradient of the trapezoidal wave is also changed every pulse in addition to the pulse width, the effect of suppressing flicker is further improved. When all the pulse width, the current value, and the gradient of the trapezoidal wave are changed every pulse, the effect of suppressing flicker is still further improved. In the embodiment, the waveform of the current pulse is a trapezoidal wave. However, the waveform is not limited to the trapezoidal wave as long as it changes in current value along with time in a pulse width duration. For example, as shown in Patent Document 1 described above, the waveform can be a waveform in which a second rectangular wave whose pulse width is smaller than that of a first rectangular wave is superimposed on the first rectangular wave. In this case, instead of changing the gradient of the trapezoidal wave, the pulse width, current value, phase, or the like of the second rectangular wave is changed every pulse.

Fourth Embodiment

Figure 5:
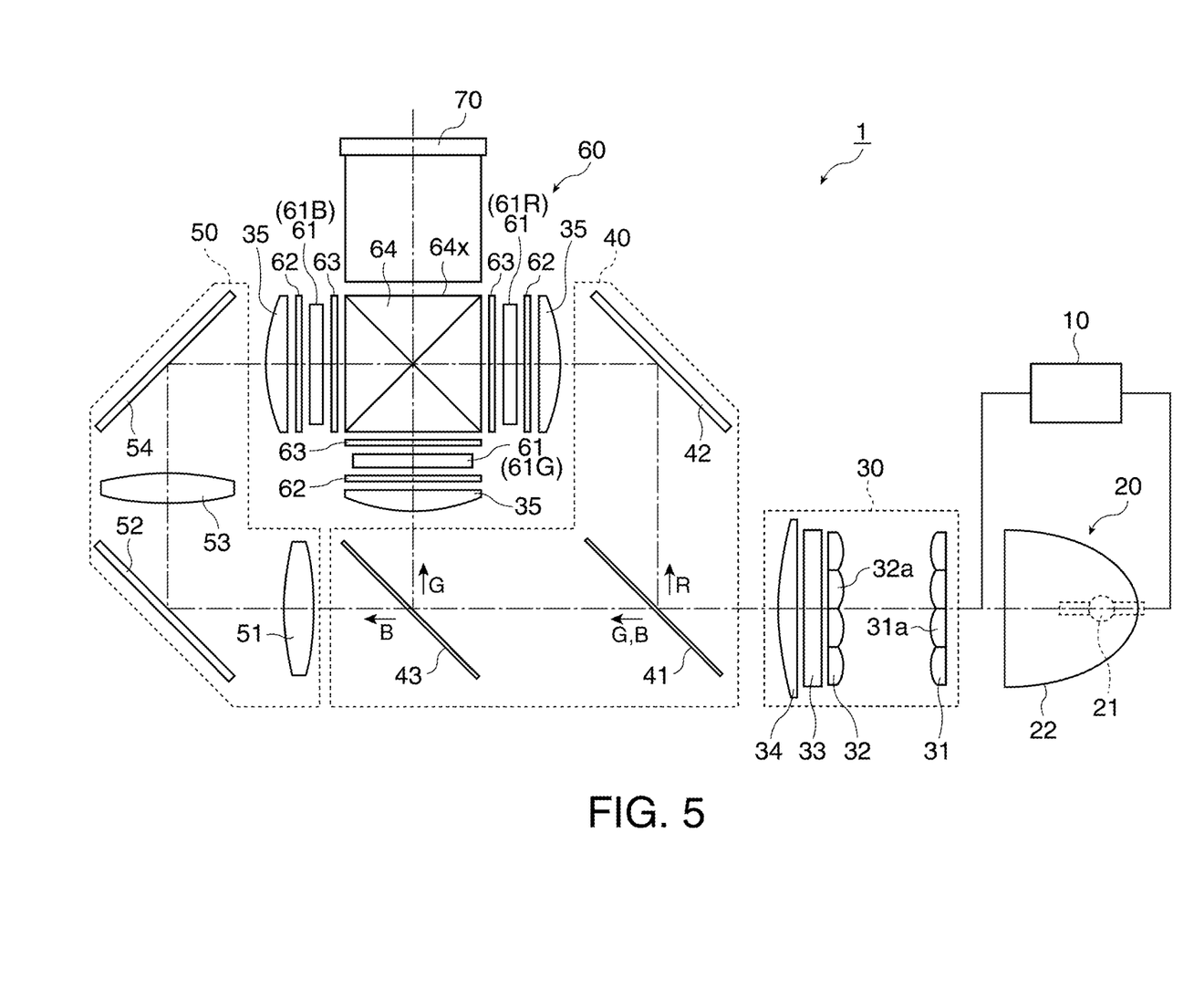
FIG. 5 is a block diagram showing a schematic configuration of a projector including the discharge lamp lighting device.

FIG. 5 is a block diagram showing a schematic configuration of a projector including any of the above-described discharge lamp lighting devices according to the first to third embodiments.

As shown in FIG. 5, the projector 1 includes any of the discharge lamp lighting devices 10 according to the first to third embodiments, the light source device 20, an optical integration system 30, a color separation system 40, a relay system 50, an image forming unit 60, and a projection lens 70 as a projection system. The image forming unit 60 is provided with liquid crystal panels 61 as light modulators. The projector 1 modulates light emitted from the light source device 20 with the liquid crystal panels 61 to form image light.

As described above, the light source device 20 is configured to include the discharge lamp 21 and the reflection mirror 22, is turned on by the driving of the discharge lamp lighting device 10, and emits luminous flux to the optical integration system 30. The light source device 20 is detachable with respect to the projector 1 so that the light source device 20 can be exchanged for a new light source device 20 when it reaches the end of its life or breaks down.

The optical integration system 30 is configured to include a first lens array 31, a second lens array 32, a polarization conversion element 33, and a superimposing lens and has a function of homogenizing the brightness distribution of the luminous flux emitted from the light source device 20. The first lens array 31 and the second lens array 32 respectively include small lenses 31a and 32a arranged in a matrix. The luminous flux incident from the light source device 20 is divided into plural, small partial luminous fluxes by the first lens array 31. The second lens array 32 and the superimposing lens 34 are provided so that the entire liquid crystal panel 61 as an illumination object is irradiated with the divided partial luminous fluxes. Therefore, the partial luminous fluxes are superimposed on the liquid crystal panel 61, and the entire liquid crystal panel 61 is substantially uniformly illuminated.

The polarization conversion element 33 has a function of aligning the light from the light source device 20 into polarized light having a specified polarization direction in order to efficiently use the light with the liquid crystal panel 61. The polarized light exiting from the optical integration system 30 enters the color separation system 40.

The color separation system 40 includes a first dichroic mirror 41, a first reflection mirror 42, and a second dichroic mirror 43 and separates the light exiting from the optical integration system 30 into three color lights each having a different wavelength range. The first dichroic mirror 41 reflects substantially red light (red light R) and transmits light having a wavelength shorter than that of the red light R. The red light R reflected by the first dichroic mirror 41 is further reflected by the first reflection mirror 42 and parallelized by a parallelizing lens 35 to illuminate a liquid crystal panel 61R for red light of the image forming unit 60.

The second dichroic mirror 43 transmits substantially blue light (blue light B) and reflects light having a wavelength longer than that of the transmitting light. Therefore, substantially green light (green light G) of the light having passed through the first dichroic mirror 41 is reflected by the second dichroic mirror 43 and parallelized by the parallelizing lens 35 to illuminate a liquid crystal panel 61G for green light of the image forming unit 60. The blue light B transmits through the second dichroic mirror 43 to enter the relay system 50. After going through the relay system 50, the blue light is parallelized by the parallelizing lens 35 to illuminate a liquid crystal panel 61B for blue light of the image forming unit 60.

Here, the path of the blue light B is longer than that of the other color lights. Therefore, for suppressing a reduction in illumination efficiency for the liquid crystal panel 61 due to the divergence of the luminous flux, the relay system 50 is disposed in the path of the blue light B. The relay system 50 includes a light incident-side lens 51, a second reflection mirror 52, a relay lens 53, and a third reflection mirror 54. The blue light B entering the relay system 50 converges in the vicinity of the relay lens 53 through the light incident-side lens 51 and diverges toward the parallelizing lens 35.

The image forming unit 60 is configured to include the three liquid crystal panels 61 (the liquid crystal panel 61R for red light, the liquid crystal panel 61G for green light, and the liquid crystal panel 61B for blue light) as light modulators, a light incident-side polarizer 62 and a light exiting-side polarizer 63 respectively arranged on the light incident side and the light exiting side of each of the liquid crystal panels 61, and a cross dichroic prism 64 as a light combining system.

The liquid crystal panel 61 has liquid crystal sealed between a pair of transparent substrates. On the inner surface of the transparent substrate, transparent electrodes (pixel electrodes) capable of applying a drive voltage to the liquid crystal in each small region (pixel) are formed in a matrix. Each of the light incident-side polarizer 62 and the light exiting-side polarizer 63 can transmit only polarized light having a specified polarization direction. The light incident-side polarizer 62 can transmit polarized light having a polarization direction aligned by the polarization conversion element 33. Therefore, most part of each color light emitted toward the liquid crystal panel 61 transmits through the light incident-side polarizer 62 to be incident on the liquid crystal panel 61.

In this case, when the drive voltage based on image information input from the outside is applied to each pixel of the liquid crystal panel 61 by a not-shown liquid crystal drive circuit, the light incident on the liquid crystal panel 61 is modulated according to the drive voltage to become polarized light having a different polarization direction in each pixel. Of the polarized light, only a polarization component capable of transmitting through the light exiting-side polarizer 63 exits from the light exiting-side polarizer 63. That is, the liquid crystal panel 61 and the light exiting-side polarizer 63 transmit incident light at a different transmittance ratio in each pixel according to the image information, whereby image lights having gradation are formed for the respective color lights. The image lights exiting from the light exiting-side polarizers 63 and formed of the respective color lights enter the cross dichroic prism 64.

In the cross dichroic prism 64, a dielectric multilayer film for reflecting red light and a dielectric multilayer film for reflecting blue light are provided substantially in an X-shape along interfaces of four rectangular prisms. The image lights of the respective colors exiting from the light exiting-side polarizers 63 are combined by the dielectric multilayer films. The image light combined by the cross dichroic prism 64 exits from a light exiting surface 64x as color image light and enters the projection lens 70.

The projection lens 70 is arranged on the light exiting surface 64x side of the cross dichroic prism 64, and enlarges and projects the image light formed by the image forming unit 60. The image light exiting from the projection lens 70 is projected onto an external screen or the like.

According to the projector 1 of the embodiment as described above, since the projector 1 includes the discharge lamp lighting device 10 of the first to third embodiments, the same effect as that of the first to third embodiments can be provided.

In the embodiment, although the three-plate type projector 1 having the three liquid crystal panels 61 as light modulators has been described, this is not restrictive. For example, a mode is also possible in which an image is formed by one liquid crystal panel 61 including sub-pixels that can respectively transmit R light, G light, and B light, in each pixel.

In the embodiment, although the transmissive liquid crystal panel 61 is used as a light modulator, a reflective light modulator such as a reflective liquid crystal panel can also be used. Moreover, it is also possible to use a micromirror array device or the like that modulates light emitted from a light source by controlling the exiting direction of incident light for each micromirror as a pixel.

MODIFIED EXAMPLES

The embodiments may be modified as follows.

In the embodiments, although the pulse width and the like are randomly determined every pulse, a timing for determining the pulse width and the like is not limited to the timing of every pulse. For example, the pulse width may be randomly determined at a rate of once a plurality times, and for the subsequent current pulses, pulse widths each of which is shifted by a predetermined amount from the determined pulse width may be determined.

In the embodiments, when the pulse width, the current value, the gradient of the trapezoidal wave are randomly determined within the respective predetermined fluctuation ranges, the fluctuation ranges are not limited to the range (±10%) illustrated in the embodiments, but they may be smaller or larger than that. Moreover, the fluctuation ranges may be changed according to the temporal change of the lamp voltage.

In the embodiments, although the pulse width and the like are changed every pulse for both the first pulse train and the second pulse train, the pulse width and the like may be changed every pulse only for one of the pulse trains, and the pulse width and the like may be fixed for the other pulse train.

The entire disclosure of Japanese Patent Application No. 2009-243208, filed Oct. 22, 2009 is expressly incorporated by reference herein.

What is claimed is:

1. A discharge lamp lighting device comprising:
a DC power supply unit that outputs a DC current;
an inverter that sequentially generates, from the DC current output from the DC power supply unit, a current pulse whose current direction alternately changes to supply the current pulse to a discharge lamp; and
a control unit that controls operations of the DC power supply unit and the inverter to adjust a waveform of the current pulse to be supplied to the discharge lamp,
wherein:
the control unit changes a pulse width of the current pulse every pulse such that consecutive pulses are applied for different lengths of time, and
the control unit randomly determines the pulse width of the current pulse within a predetermined fluctuation range such that a current-direction changing time period is not constant.

2. The discharge lamp lighting device according to claim 1, wherein
the control unit changes a current value of the current pulse every pulse.

3. The discharge lamp lighting device according to claim 1, wherein
the control unit generates a current pulse of a trapezoidal wave and changes a gradient of the trapezoidal wave every pulse.

4. The discharge lamp lighting device according to claim 3, wherein the trapezoidal wave for each pulse slopes between a first current value and a second current value according to the corresponding gradient.

5. A projector comprising:
the discharge lamp lighting device according to claim 1;
a discharge lamp that is turned on by receiving the supply of a current pulse from the discharge lamp lighting device;
an image forming unit that modulates light emitted from the discharge lamp to form image light; and
a projection system that projects the image light formed by the image forming unit.

6. The discharge lamp lighting device according to claim 1, wherein the control unit randomly determines a separate pulse width for each pulse.

7. A method for driving a discharge lamp, comprising:
sequentially generating a current pulse whose current direction alternately changes and whose pulse width is different every pulse such that consecutive pulses are applied for different lengths of time; and
supplying the current pulse to the discharge lamp to turn on the discharge lamp,
wherein the sequentially generating the current pulse includes randomly changing the pulse width of the current pulse within a predetermined fluctuation range such that a current-direction changing time period is not constant.

8. A discharge lamp lighting device comprising:
a DC power supply unit that outputs a DC current; and
an inverter that sequentially generates, from the DC current output from the DC power supply unit, a current pulse whose current direction alternately changes to supply the current pulse to a discharge lamp,
wherein:
a pulse width of the current pulse changes for every pulse such that consecutive pulses are applied for different lengths of time, and
the pulse width of the current pulse randomly changes within a predetermined fluctuation range such that a current-direction changing time period is not constant.

9. The discharge lamp lighting device according to claim 8, wherein
a current value of the current pulse changes for every pulse.

10. The discharge lamp lighting device according to claim 8, wherein
the current pulse is a trapezoidal wave and a gradient of the trapezoidal wave changes for every pulse.

11. A projector comprising:
the discharge lamp lighting device according to claim 8;
a discharge lamp that is turned on by receiving the supply of a current pulse from the discharge lamp lighting device;

an image forming unit that modulates light emitted from the discharge lamp to form image light; and a projection system that projects the image light formed by the image forming unit.

\* \* \* \* \*